2,508,353

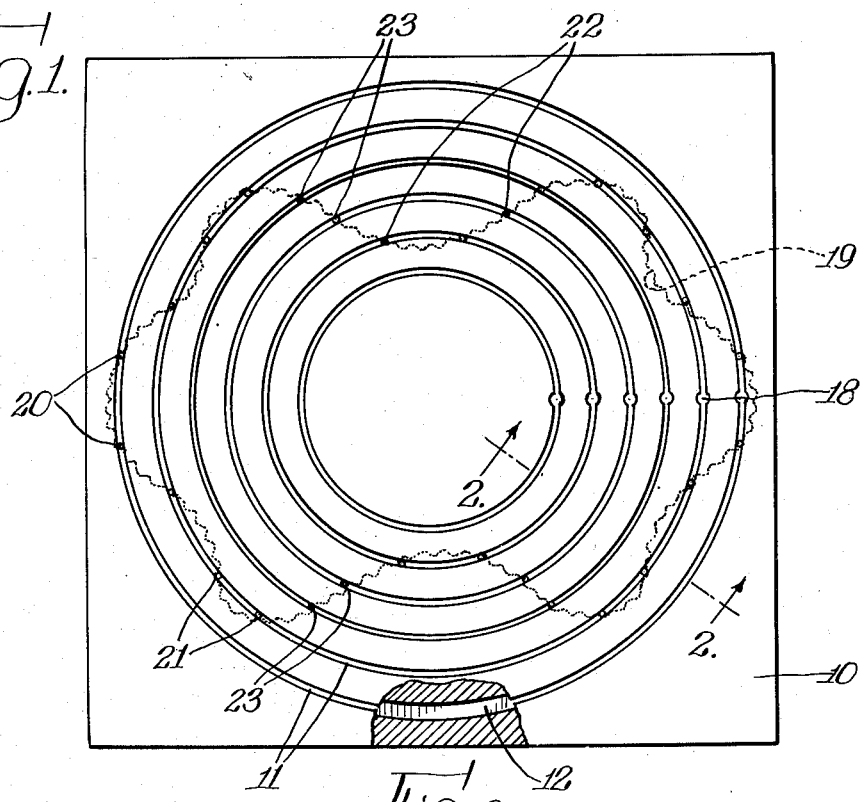
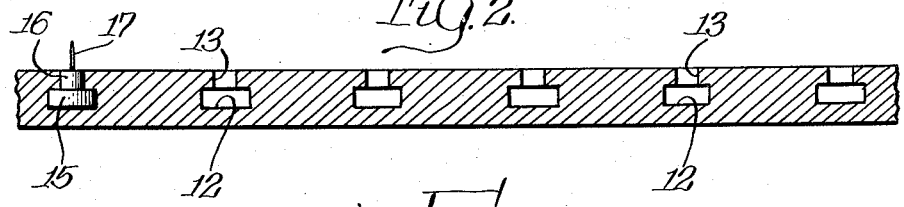
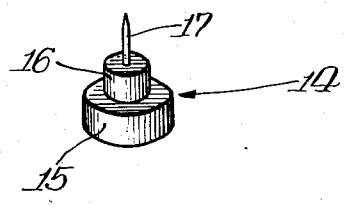
INVENTORS.
Steve J. Brewczynski,
John Brewczynski, Patented May 23, 1950

UNITED STATES PATENT OFFICE 2,508,353

STRETCHING AND DRYING DEVICE FOR FABRIC MATERIAL

Steve J. Brewczynski and John Brewczynski, Chicago, Ill.

Application September 24, 1947, Serial No. 775,926

5 Claims. (Cl. 45—24)

The present invention relates to the fabric stretching and drying devices, and has for its main object the provision of a device whereby a fabric sheet of material, having an irregular perimeter, such as doily or the like, may be stretched and upon which the same may dry when in a stretched condition.

A further object of the present invention is the provision of a stretching and drying device of the character indicated provided with a plurality of concentrically arranged grooves, wherein a plurality of fabric engaging members may be positioned for shifting and adjusting in order that the same may engage the perimeter of a fabric sheet of irregular formation.

With the above general objects in view and others that will appear as the invention is better understood, the same consists in the novel construction, combination and arrangement of parts hereinafter more fully described, illustrated in the accompanying drawing and pointed out in the appended claims.

In the drawing forming a part of this application and in which like designating characters refer to corresponding parts throughout the several views:

Fig. 1 is an elevational view of the present device, partly in section, with a doily superimposed thereon during the process of stretching and drying thereof;

Fig. 2 is an enlarged cross-sectional view on line 2—2 of Fig. 1; and

Fig. 3 is an enlarged perspective view of a fabric engaging member which cooperates with the present device for engaging the perimeter of a fabric sheet when superimposed upon the present device.

Referring in detail to the present drawing, there is shown therein board 10, which may be made of wood, plastic or any other suitable material. Made upon said board 10, and upon one face thereof is a plurality of concentric, spaced grooves, generally indicated by 11. Said grooves may be circular, as shown, or they may be of square or rectangular formation, depending upon the general overall outline or contour of a doily or any other sheet of fabric material to be stretched and dried upon and by the present device.

Each of said grooves 11 is so formed as to provide a channel 12 within the body of board 10. Each channel 12 has a constricted, communicating recess 13, made substantially centrally of channel 12, said recess 13 opening at one face of said board 10.

Cooperating with each of said grooves 11, made as above described, is a plurality of fabric engaging members 14, one of which is best shown in Fig. 3. Each of said fabric engaging members 14 includes circular head 15, of a diameter substantially corresponding to the width of channel 12, and of a thickness substantially corresponding to the depth of said channel 12.

Cylindrical boss 16, integrally formed with said head 15, and in a concentric relation with said head 15, extends from one face of the latter. Said boss 16 has a diameter substantially corresponding to the width of recess 13, and a height substantially corresponding to the depth of said recess 13.

Pin 17, centrally extending from the free end of said boss 16, completes the structure of said fabric engaging member 14.

From the hereinabove description it will be seen that fabric engaging member 14, reposing within groove 11, is capable of being shifted longitudinally of groove 11, but is incapable of shifting transversely thereof, because the lateral walls of channel 12 and recess 13, bearing against the periphery of head 15 and boss 16, respectively, prevent such latter shifting. It is further observed that the free end of boss 16 remains flush with the adjacent face of board 10. The entire fabric engaging member 14 is embedded within board 10 while reposing within groove 11, and pin 17 is the only part of said fabric engaging member 14 which projects beyond and above the operative face of board 10, as is clearly seen in Fig. 2.

The opposed body portions in board 10, adjacent recess 13 in each groove 11, are provided with complementary, arcuate indents 18. Each pair of opposed indents 18 in each groove 11 constitute an arcuate opening of a diameter corresponding to the diameter of head 15, or to the width of channel 12, for permitting insertion therethrough of said head 15 for driving the latter into channel 12. Said head 15 once passed through the opening defined by a pair of opposed indents 18 in each groove 11, and shifted until the bottom thereof contacts with the bottom of channel 12, is capable of being shifted in either direction and longitudinally of groove 11 for bringing pin 17 into any desired position relative to the longitudinal run of groove 11.

It is understoood that as many of said fabric engaging members 14 may be inserted within each groove 11 as may be desired, and conversely as many of them may be withdrawn as desired through the openings defined by each pair of indents 18.

In Fig. 1 there is shown in dotted lines doily 19, the perimeter of which is of an irregular formation, some points thereof being farther removed from the center of the doily than the others. Thus, those points of the doily which are farthest removed from the center thereof will be engaged by pins 17 in one or two outermost grooves 11, as at 20 and 21. Those points on the perimeter of the doily which are nearest to the center of the doily will be engaged by pins in one or more of the innermost grooves 11, as at 22, while the intermediate points of the perimeter of the doily will be engaged by pins 17 shiftable within the intermediate grooves 11, as at 23.

On reference to Fig. 1, it will be seen that doily 19 can be maintained in a stretched condition upon board 10 by means of plurality of pins 17 and along various opposed directions. Take for example pins 17 at the opposed points 23. These pins are capable of maintaining the doily when in a stretched condition upon the board not only along the direction of the diameters of grooves 11 with which said pins 17 cooperate, but also along the direction of the chords defined by a pair of pins 17 in the same groove 11 at points 23. Since the stress of pull of the stretched doily is along the chord stated and not along the longitudinal run of groove 11, it follows that stress of pull of the doily due to its inherent tendency to shrink will be incapable to dislodge said pins 17 or to shift a pair of opposed pins towards each other and along groove 11, particularly when head 15 and boss 16 repose snuggly within channel 12 and recess 13, respectively. It therefore follows that when a doily is engaged at its perimeter by pins 17 in all grooves 11, said pins 17 will not shift longitudinally of said grooves 11.

As is seen in Fig. 1, the doily shown therein is substantially of the length corresponding to the diameter of the circle described by the outermost groove 11. For doilies of greater length additional outer grooves 11 may be made. However, for doilies having general square or rectangular contour grooves 11 may be made square or rectangular, respectively, instead circular as shown. Making said grooves square or rectangular would not in any manner change the operation of the device. Accordingly we do not wish to be restricted to circular grooves as obviously the grooves may be made square, rectangular or in any other desired configuration.

While there is described herein a preferred embodiment of the present invention, it is nevertheless to be understood that minor changes may be made therein without departing from the spirit and scope of the invention as claimed.

What we claim as new is:

1. A fabric stretching and drying device comprising a board, said board being provided upon its face with a plurality of concentrically arranged, spaced grooves, means within said grooves for engaging the fabric material superimposed upon said board, said means being adjustable longitudinally of said grooves.

2. A fabric stretching and drying device comprising a board, said board being provided upon its face with a plurality of concentrically arranged, spaced grooves, means within said grooves for engaging the fabric material superimposed upon said board, said means being adjustable longitudinally of said grooves, said means including heads snugly fitted within said grooves and pins projecting from said heads, said pins extending above the face of said board.

3. A stretching and drying device for fabric material having a perimeter of irregular contour comprising a board, said board being provided upon its face with a plurality of concentrically arranged grooves, and means within said grooves for engaging the fabric material at the perimeter thereof as the same crosses said grooves.

4. A stretching and drying device comprising a board, an endless groove made in said board, said groove including a channel within said board and a recess communicating with said channel and extending through one face of said board, and a fabric engaging member slidably adjustable within said groove, said fabric engaging member including a head receivable within said channel, a reduced boss carried by said head receivable within said recess, and a pin carried by said boss, said pin extending above the face of said board.

5. A stretching and drying device comprising a board, said board being provided with a groove, said groove including a channel within said board and a recess communicating with said channel and extending to one face of said board, and a fabric engaging member slidably adjustable within said groove, said fabric engaging member including a head receivable within said channel, a reduced boss carried by said head receivable within said recess, and a pin extending above the face of said board, the body portion of said board adjacent said recess being provided with a pair of complementary indents, one on each side of said recess, for providing an opening for insertion or withdrawal of said head within or from said channel.

STEVE J. BREWCZYNSKI.
JOHN BREWCZYNSKI.

REFERENCES CITED

The following references are of record in the file of this patent:

UNITED STATES PATENTS

| Number | Name | Date |
|---|---|---|
| 487,240 | Backof | Dec. 6, 1892 |
| 1,369,552 | Schramm | Feb. 22, 1921 |
| 2,160,337 | McKee | May 30, 1939 |
| 2,283,367 | Hintz | May 19, 1942 |
| 2,413,041 | Ferguson | Dec. 24, 1946 |